Patented Mar. 9, 1937

2,073,077

UNITED STATES PATENT OFFICE 2,073,077

BRAZING SOLDER

Cyril Stanley Smith, Cheshire, Conn., assignor to The American Brass Company, Waterbury, Conn., a corporation of Connecticut No Drawing. Application May 18, 1932,
Serial No. 612,158

2 Claims. (Cl. 75—154)

This invention relates to brazing solders or weld metals, and it is the purpose of my present invention to provide an alloy of low melting point for use as a brazing solder or welding rod. The copper-phosphorus alloys containing between 5 and 10 percent phosphorus are already extensively employed in the arts. I have found that additions of tin to this alloy lower the melting point without affecting the fluidity. The alloy of lowest melting point (ternary eutectic) contains in the neighborhood of 5 percent phosphorus and 15 percent tin and this melts at about 647° C. Smaller additions of tin are proportionally effective in lowering the melting point and result in a cheaper alloy. The particular advantage of the new alloys and especially of the ternary eutectic lies in their low melting points which render their use especially desirable in those structures which excessive heat would damage either by its weakening effect on the metal or by warping. Moreover, the low temperature needed permits the use of a simple form of torch or other heating device.

The amounts of tin and phosphorus may be varied so that the alloy approximates to the binary eutectic valley in the solid model of the ternary equilibrium diagram, which curve is roughly defined by compositions in which the phosphorus content plus the tin content divided by 4.4 equals approximately 8.4 percent, or stating it in the form of an equation $$\%P + \frac{\%Sn}{4.4} = 8.4$$

Thus if the alloy contains 5 percent phosphorus and 15 percent tin we have $$5 + \frac{15}{4.4} = 8.4$$

Although the alloys of lowest melting point for a given tin content are closely defined by this formula, alloys with more copper are stronger and more ductile and alloys with higher phosphorus content may be used where considerable oxidation is likely to occur during melting. The series of alloys which are useful for soldering or welding lies within the range where the percent phosphorus plus the percentage of tin divided by 4.4 lies between 3 and 10, the amount of tin being from 1 percent to 20 percent.

The alloys as above decribed have been satisfactorily used for soldering non-ferrous metals and alloys and have also been used for soldering steel, although in the latter case the formation of iron-phosphides at the surface of the steel renders the joint excessively brittle. The alloys may be used in the form of cast rods or in the granulated condition with or without suitable admixture of flux. Certain of the alloys may be hot worked to form rod or wire but this is a difficult operation and in general the cast or granulated form is preferred. If the surfaces to be joined are clean no flux is necessary, but the use of flux is advisable. The melting point of the alloy is too low for the use of borax alone, but borax with a suitable addition, such as sodium fluoride or zinc chloride to reduce the melting point may be used.

The presence of the usual impurities such as iron, zinc, lead and so forth in commercial alloys does not modify the action of the solder. I have also found that small additions of cadmium, antimony and silicon are without deleterious effects, but aluminum and magnesium form tenacious oxide films and interfere with the running qualities.

The high fluidity and low melting point of the alloys also renders them suitable for the manufacture of die castings and castings in permanent molds, especially in those cases where an accurate finish is desired and high ductility is not of great importance.

Having thus set forth the nature of my invention, what I claim is:

1. A brazing solder composed of tin from 13% to 17%, phosphorus from 3.5% to 5.5%, and the balance copper.

2. A brazing solder composed of approximately 15% tin, 5% phosphorus, and 80% copper.

CYRIL STANLEY SMITH.